United States Patent Office 3,059,712
Patented Oct. 23, 1962

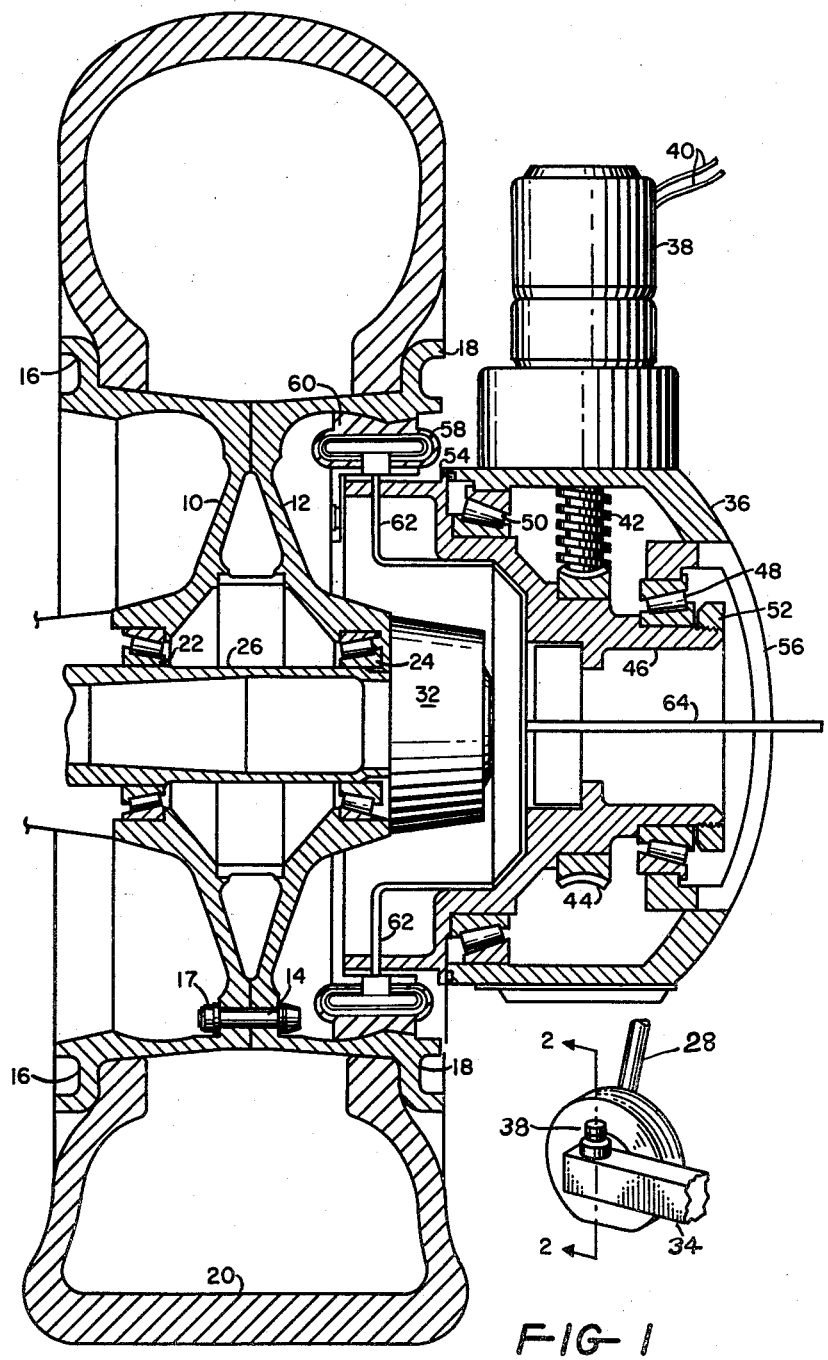

3,059,712
AIRCRAFT WHEEL POWERING DEVICE
Charles F. Hautau, 146 Hilltop Road, Oxford, Ohio
Filed Nov. 13, 1961, Ser. No. 153,248
1 Claim. (Cl. 180—10)

This invention relates to a device for rotating the wheels of vehicles having non-rotatable axles and more particularly to a device for engaging, steering, and rotating the landing wheels of jet aircraft so as to move the planes about on the ground.

The wheels upon which aircraft are disposed while on the ground are normally free to rotate about their axles and the plane is powered by the reaction forces created by the rotation of its propellers or exhaust of a jet engine. Such a ground propulsion system creates several problems when it is utilized with jet aircraft. In order for a jet engine to provide sufficient thrust to move the plane it must be operated at a high speed. Also, the lengthy runways which are necessary for jets substantially increases the amount of taxiing that the plane must do on the ground. As a result the plane must carry a large amount of fuel which is used only for ground propulsion. Finally, the high temperature exhaust of a jet engine does not permit any human activity in a wide area surrounding the engine while it is in operation.

For these reasons it has been suggested that vehicles be provided which may attach to the wheels of jet aircraft while on the ground so as to steer and rotate the wheels to move the plane without necessity of operating its engines. It is desirable to power the wheels of the plane directly rather than to drag the plane with an external propulsion unit because such external unit would have to be extremely large in order to have a high enough frictional drag with respect to the ground to move the heavy plane.

The present invention relates to means for engaging the aircraft wheels and rotating them. The engagement forces must be sufficient to transmit the high torsional forces necessary to rotate the wheel and also to move the wheel or set of wheels about their suspension units so as to steer the plane. It is also desirable that the coupling be of such nature that it is not necessary to obtain a high degree of alignment between the driving mechanism and the wheel, since it is necessary that several interconnected driving units attach to several wheels which may be at different elevations because of their accommodation to the ground level.

One embodiment of the invention, which will be subsequently described in detail, includes a stationary member which is fixed with respect to the driving vehicle and supports and hydraulic motor. A rotatable member is journalled within the stationary member and may be turned by the hydraulic motor through a worm drive. The rotatable member carries an extension having an annular expandable tube disposed about its outer diameter. This tube is adapted to be inserted coaxially within the dished rim of a wheel to be driven. The annular tube is then expanded by fluid means so as to engage the inner diameter of the rim along its entire circumference. When the hydraulic motor is energized the worm drive powers the rotatable motor and transmits its motion to the wheel.

It is therefore seen to be an object of the present invention to provide a device for engaging the wheels of aircraft in order to rotate them so as to propel the vehicle or pivot them about their suspension point in order to steer the vehicle.

Another object is to provide such an engagement mechanism which utilizes a flexible expandable annulus which engages the rim of the wheel to be driven.

A further object is to provide such a wheel engaging device which is simple in construction so as to be light in weight and economical in cost.

Other objects, advantages and applications of the present invention will be made apparent by the following detailed description of an embodiment of the invention. The description makes reference to the accompanying drawings in which:

FIGURE 1 represents a partial perspective view of an embodiment of the present invention engaged with the wheel of an aircraft; and FIGURE 2 is a cross-sectional view of the present invention and the wheel of an aircraft taken along lines 2—2 of FIGURE 1.

The aircraft wheel employs a rim formed of a pair of similar dished radially symmetrical sections 10 and 12 which are joined together by a circle of bolts 14 which pass through holes in both rim sections at points near their periphery and are fastened by nuts 16. At the radially outer ends the rim sections 10 and 12 respectively carry shoulders 16 and 18 which are adapted to engage the inner diameter of a pneumatic tire 20.

The rims 10 and 12 journal two pairs of roller bearings 22 and 24 at their centers. These bearings have their inner races fixed to a non-rotatable hollow axle 26, shown broken away at the left in FIGURE 2, extends to a suspension mechanism 28 connected to the aircraft. This suspension mechanism, which connects to the aircraft 30, may be of any general type which allows the wheel to be rotated with respect to the aircraft about a vertical plane for steering purposes. The outer end of the axle 26 is covered by a cap 32 which prevents dirt from entering the bearing 24.

The wheel gripping mechanism is supported on an elongated boom 34 which attaches to a linkage (not shown) including other booms which connect to the various other wheels in the airplane. The linkage may be actuated so as to cause the steering wheels to move parrallel to one another. The boom 34 also accepts the torque exerted in driving the aircraft wheel. The linkage and the other booms are not shown as they may be of any convention configuration and the present invention does not resides therein. A structure of this nature is disclosed in Design News Magazine, April 25, 1960, cover and pages 6–7.

The boom 34 terminates in a semi-rounded housing 36 which supports the hydraulic motor 38 on its upper surface. The motor is supplied with fluid and releases its spent fluid through a pair of lines 40 which connect to an appropriate fluid pressure source. The shaft of the motor 38 terminates in a screw gear 42 which extends into the housing 36 and meshes with a ring gear 44 on the rear side of FIGURE 2. The ring gear 44 is fitted about a cylindrical rotatable member 46. The member 46 is journalled within the housing 36 by means of tapered roller bearings 48 and 50 which are disposed within the inner diameter of the housing 36 and the outer diameter of the rotatable member 46. The bearing 48 is retained in position by a nut 52 which may be screwed on a threaded outer diameter of the rotatable member 46. A felt seal 54 extends from the leftward edge of the housing 36 as viewed in FIGURE 2 and contacts a lip on the rotatable member 46 to prevent dirt from reaching the bearing 50. Similarly a sheet metal cap 56 extends over the open end of the housing 36 to prevent dirt from reaching the bearings 48.

The end of the rotatable member 46 in proximity to the wheel carries an inflatable rubber tube 58 on its outer diameter. The tube has a thickened rubber face 60 on its outer diameter.

In the preferred embodiment the tube 58 is inflated pneumatically by means of a pair of tubes 62 which connect with its inner diameter and join one another in a tube 64 to pass through the cover plate 56. This tube may then be connected to a source of compressed air through a unidirectional valve.

The rotatable member 46 is so designed that when the tube 58 is deflated the outer diameter of the face 60 is small enough to project within the inner diameter afforded by the generally axial extension of the rim 12. The tube 58 may then be inflated, bring the face 60 into pressured contact with an area along the perimeter of the rim 12. The necessary inflation pressure is a function of the force required to rotate the aircraft wheel.

The member 46 may then be rotated by means of the motor 38. As the screw gear 42 on the shaft of the motor 38 rotates it causes the ring gear 44 to rotate. The large mechanical advantage afforded by the screw gear engagement allows a relatively small hydraulic motor to provide the force necessary to rotate the wheels. The reaction of the housing 36 to the force is absorbed through the boom 34.

Having thus described my invention, I claim:

A device of the type described for engaging an aircraft wheel having a dished rim for purposes of rotating and steering said wheel; a boom terminated in a housing and operative to receive the twisting forces exerted thereon; a fluid motor supported on said housing; a member fixed for rotation about a generaly horizontal axis with respect to said housing; gear means drivingly connecting said motor to said rotatable member; a coaxial annular surface extending from said rotatable member; an annular inflatable tube disposed on the outer diameter of said annular surface; and fluid pressure means for inflating said tube so as to bring its outer surface into pressured contact with said wheel rim and to move said housing so as to bring the axis of rotation of said member into substantial alignment with the axis of rotation of the wheel, whereby the device is substantially supported by the wheel rim.

References Cited in the file of this patent
UNITED STATES PATENTS

| | | |
|---|---|---|
| 2,251,445 | Fawick | Aug. 5, 1941 |
| 2,869,662 | Koup | Jan. 20, 1959 |